United States Patent
Lu et al.

(10) Patent No.: US 11,126,066 B2
(45) Date of Patent: Sep. 21, 2021

(54) DIGITAL IMAGING DEVICE

(71) Applicant: Chicony Electronics Co., Ltd., New Taipei (TW)

(72) Inventors: Jiun-Nan Lu, New Taipei (TW); Chung-Chao Lee, New Taipei (TW); An-Hwa Yu, New Taipei (TW); Wen-Hwa Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 6 days.

(21) Appl. No.: 16/750,379

(22) Filed: Jan. 23, 2020

(65) Prior Publication Data

US 2021/0063845 A1     Mar. 4, 2021

(30) Foreign Application Priority Data

Sep. 4, 2019   (TW) ................................. 108131955

(51) Int. Cl.
    *G03B 13/32*     (2021.01)
    *H04N 5/225*     (2006.01)
    *G02B 7/04*     (2021.01)

(52) U.S. Cl.
    CPC .............. *G03B 13/32* (2013.01); *G02B 7/04* (2013.01); *H04N 5/2252* (2013.01); *H04N 5/2253* (2013.01); *H04N 5/2254* (2013.01); *H04N 5/2256* (2013.01)

(58) Field of Classification Search
CPC .. H04N 5/2256; H04N 5/2252; H04N 5/2254; H04N 5/2253; G02B 7/04; G03B 13/32
See application file for complete search history.

(56) References Cited

U.S. PATENT DOCUMENTS

| 7,453,516 | B2 | 11/2008 | Husni et al. |
| 8,018,507 | B2 * | 9/2011 | Kinoshita ............ H04N 5/2254 348/262 |
| 10,812,698 | B1 * | 10/2020 | Zhou .................... G03B 17/561 |

(Continued)

FOREIGN PATENT DOCUMENTS

| JP | 2006243701 A | 9/2006 |
| TW | M343827 U | 11/2008 |
| TW | M352034 U | 3/2009 |

*Primary Examiner* — Lin Ye
*Assistant Examiner* — John H Morehead, III
(74) *Attorney, Agent, or Firm* — Muncy, Geissler, Olds & Lowe, P.C.

(57) ABSTRACT

A digital imaging device includes a casing, a photosensitive device, a light shielding barrel, a movable lens barrel, and a driving device. The casing includes a closed end and an open end. The photosensitive device is disposed inside the casing and adjacent to the closed end. The photosensitive device has a photosensitive element. The light shielding barrel is disposed inside the casing. The light shielding barrel includes a fixed end fixed inside the casing and surrounding the photosensitive element. The movable lens barrel is coaxially disposed with the light shielding barrel. The movable lens barrel includes a lens end and a driving portion. The lens end includes an optical lens coaxially disposed with the photosensitive element. The driving device is connected to the driving portion. The driving device drives the movable lens barrel to move axially relative to the light shielding barrel.

10 Claims, 9 Drawing Sheets

(56) References Cited

U.S. PATENT DOCUMENTS

| | | | | |
|---|---|---|---|---|
| 2003/0174412 | A1* | 9/2003 | Noguchi | G02B 7/102 |
| | | | | 359/694 |
| 2006/0002696 | A1* | 1/2006 | Onishi | G03B 17/04 |
| | | | | 396/85 |
| 2006/0158750 | A1* | 7/2006 | Takahashi | G02B 7/102 |
| | | | | 359/819 |
| 2009/0040360 | A1* | 2/2009 | Taniguchi | H04N 5/2257 |
| | | | | 348/335 |
| 2010/0225755 | A1* | 9/2010 | Tamaki | H04N 5/2257 |
| | | | | 348/78 |
| 2011/0001872 | A1* | 1/2011 | Honsho | G02B 27/646 |
| | | | | 348/362 |
| 2011/0234890 | A1* | 9/2011 | Kobayashi | H04N 5/2254 |
| | | | | 348/373 |
| 2013/0162893 | A1* | 6/2013 | Hirota | H04N 5/2254 |
| | | | | 348/360 |
| 2014/0347742 | A1* | 11/2014 | Ooya | G02B 7/04 |
| | | | | 359/700 |
| 2015/0051498 | A1* | 2/2015 | Darty | G16H 50/50 |
| | | | | 600/477 |
| 2017/0244934 | A1* | 8/2017 | Chien | G06T 7/70 |
| 2017/0353640 | A1* | 12/2017 | Wang | H01L 27/14618 |
| 2019/0101718 | A1* | 4/2019 | Masuzawa | G02B 7/021 |
| 2019/0187402 | A1* | 6/2019 | Masuzawa | G02B 7/026 |
| 2019/0235217 | A1* | 8/2019 | Hasegawa | H04N 5/225 |

* cited by examiner

DIGITAL IMAGING DEVICE

CROSS-REFERENCE TO RELATED APPLICATION

This non-provisional application claims priority under 35 U.S.C. § 119(a) to patent application Ser. No. 10/813,1955 in Taiwan, R.O.C. on Sep. 4, 2019, the entire contents of which are hereby incorporated by reference.

BACKGROUND

Technical Field

The instant disclosure relates to an imaging device, in particular, to a digital imaging device.

Related Art

People use imaging device with imaging mirror to observe objects; for example, telescopes are used to observe distant objects while microscopes are used to observe tiny objects. For imaging devices known to the inventor(s), mostly the imaging method is implemented by transmitting the image of the object to the retina of the user through an eyepiece; or, the imaging devices known to the inventor(s) may be provided with a display, and the user can observe the object through the display.

SUMMARY

However, the imaging device known to the inventor(s) is provided with a fixed imaging mirror, and the user has to exchange the eyepiece to observe an image in a different magnification, thereby resulting in the inconvenience during operation.

In view of these, in one embodiment, a digital imaging device is provided. The digital imaging device comprises a casing, a photosensitive device, a light shielding barrel, a movable lens barrel, and a driving device. The casing is extending along an extension axis. The casing comprises a closed end and an open end opposite to the closed end. The photosensitive device is disposed inside the casing and adjacent to the closed end. The photosensitive device has a photosensitive element facing the open end. The light shielding barrel is disposed inside the casing and extending along the extension axis. The light shielding barrel comprises a fixed end and a movable end. The fixed end is fixed inside the casing and surrounding the photosensitive element. The movable lens barrel is coaxially disposed with the light shielding barrel. The movable lens barrel comprises a lens end and a driving portion. The lens end comprises an optical lens, and the optical lens is coaxially disposed with the photosensitive element. The driving device is connected to the driving portion of the movable lens barrel. The driving device drives the movable lens barrel to move axially relative to the light shielding barrel, so that the optical lens selectively moves near to or away from the photosensitive element.

Based on the above, according to the digital imaging device of one or some embodiments of the instant disclosure, the driving device is adapted to drive the movable lens barrel to move axially relative to the light shielding barrel, so that the optical lens at the lens end of the movable lens barrel moves near to or away from the photosensitive element. Hence, the distance between the optical lens and the photosensitive element can be changed, so that the magnification or reduction ratio of the optical image can be adjusted freely.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
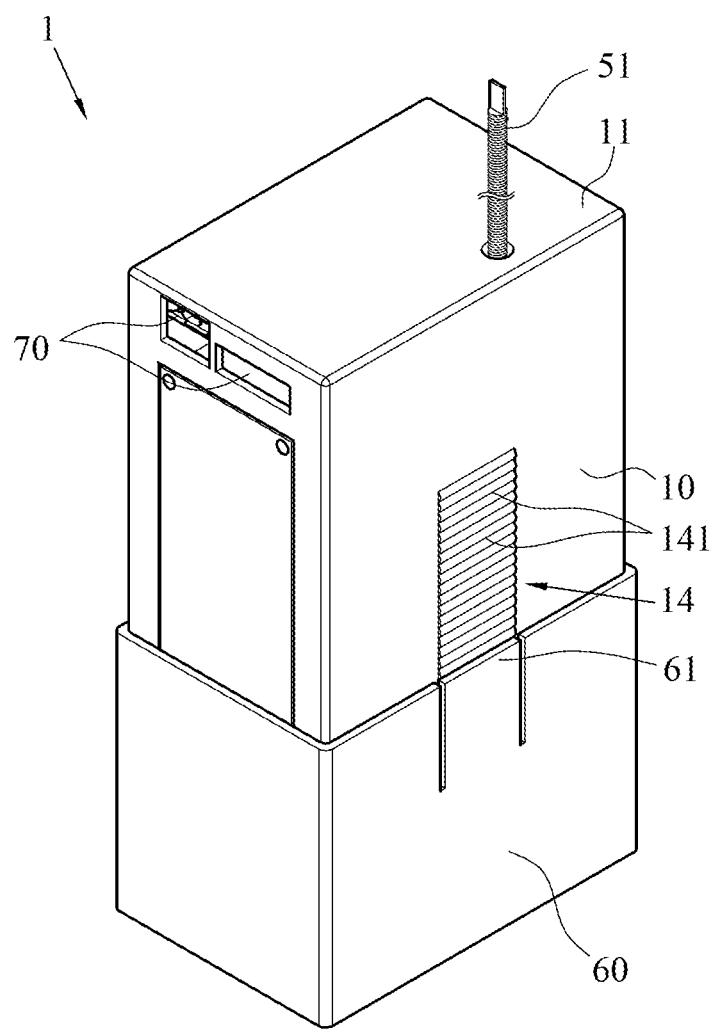
FIG. 1 illustrates a perspective view of a digital imaging device according to a first embodiment of the instant disclosure.
Figure 2:
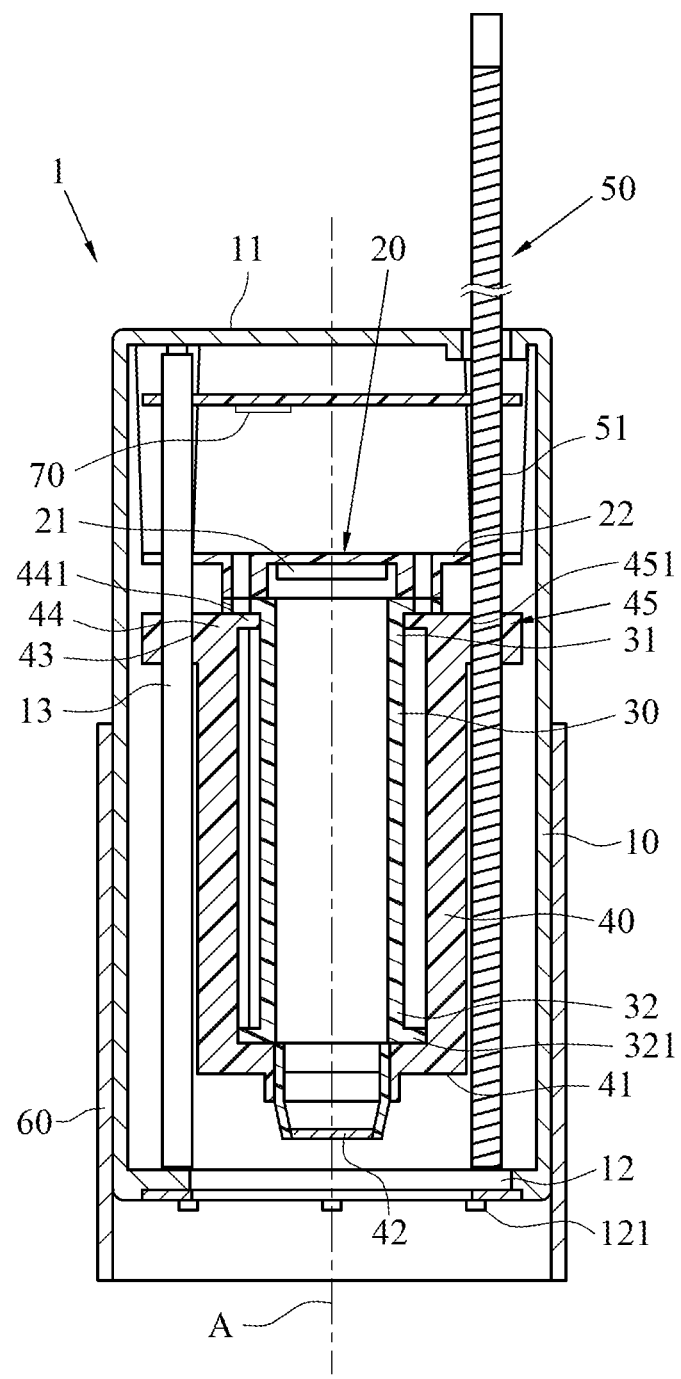
FIG. 2 illustrates a cross-sectional view of the digital imaging device of the first embodiment.
Figure 3:
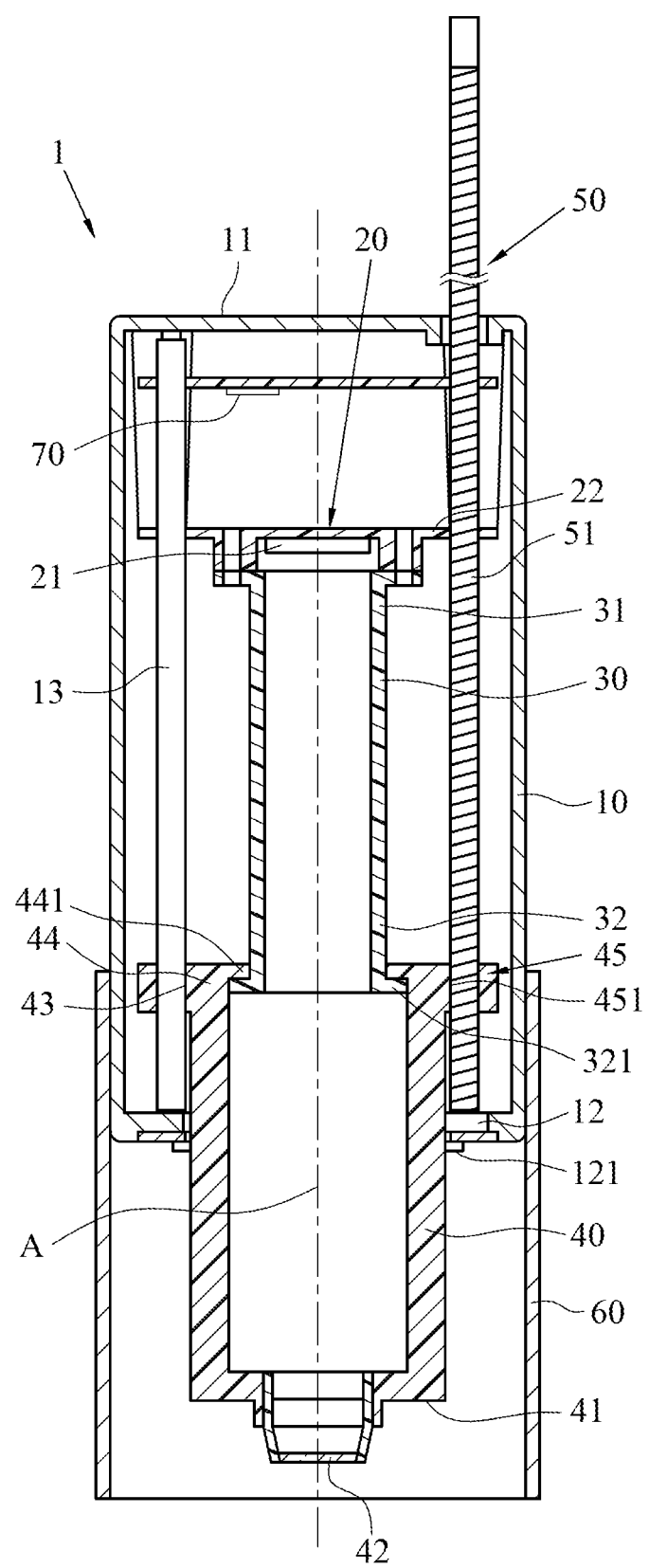
FIG. 3 illustrates a schematic operational view of the digital imaging device of the first embodiment.
Figure 4:
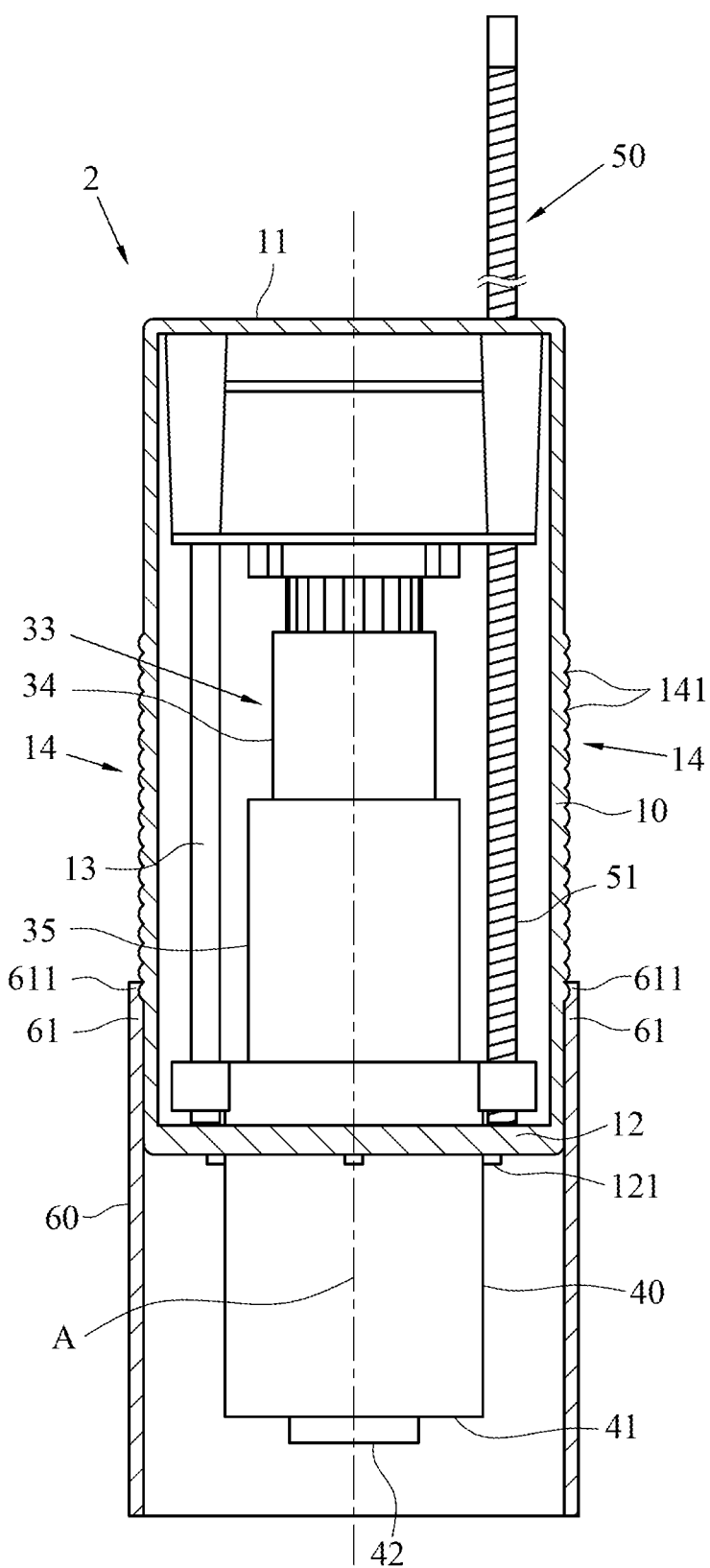
FIG. 4 illustrates another cross-sectional view of the digital imaging device of the first embodiment.

FIG. 1 illustrates a perspective view of a digital imaging device according to a first embodiment of the instant disclosure. FIG. 2 illustrates a cross-sectional view of the digital imaging device of the first embodiment. FIG. 3 illustrates a schematic operational view of the digital imaging device of the first embodiment. FIG. 4 illustrates another cross-sectional view of the digital imaging device of the first embodiment. As shown in FIGS. 1 and 2, in this embodiment, the digital imaging device 1 comprises a casing 10, a photosensitive device 20, a light shielding barrel 30, a movable lens barrel 40, and a driving device 50. In some embodiments, the digital imaging device 1 may be a digital microscope device or a digital telescope device, and the movable lens barrel 40 can be driven to move relative to the light shielding barrel 30, so that the magnification or reduction ratio of the optical image can be adjusted freely. Related descriptions are provided as below.

As shown in FIGS. 1 and 2, in this embodiment, the casing 10 may be, but not limited to, an elongated hollow casing. The casing 10 is extending along an extension axis A, and the casing 10 comprises a closed end 11 and an open end 12 opposite to the closed end 11. In other words, the closed end 11 and the open end 12 are respectively at opposite ends of the extension axis A, and the open end 12 is not closed, so that the casing 10 is in communication with the external environment. In some embodiments, the casing 10 may be of any shapes, for example, the casing 10 may be of a rectangular shape (as shown in FIG. 1), a circular shape, a cubic shape, or may be of other irregular shapes.

As shown in FIGS. 1 and 2, the photosensitive device 20 is disposed inside the casing 10 and adjacent to the closed end 11. The photosensitive device 20 has a photosensitive element 21, and the photosensitive element 21 faces the open end 12. In this embodiment, the photosensitive device 20 has a circuit board 22, and the circuit board 22 is fixed inside the casing 10 and adjacent to the closed end 11. For example, the circuit board 22 may be fixed inside the casing 10 by ways of adhering, threading, engaging, hot-melting, or the like, and the photosensitive element 21 is disposed on a surface of the circuit board 22 facing the open end 12. In some embodiments, specifically, the photosensitive element 21 may be a charge-coupled device (CCD), a complementary metal-oxide semiconductor (CMOS), or a CMOS active pixel sensor, for sensing and obtaining the optical image.

As shown in FIGS. 1 and 2, the light shielding barrel 30 is disposed inside the casing 10 and extending along the extension axis A. The light shielding barrel 30 comprises a fixed end 31 and a movable end 32 axially opposite to the fixed end 31. The fixed end 31 is fixed inside the casing 10 and surrounding the photosensitive element 21. For example, in this embodiment, the light shielding barrel 30 is a fixed sleeve which is unmovable. The fixed end 31 of the light shielding barrel 30 is fixed on the surface of the circuit board 22 facing the open end 12. For example, the fixed end 31 may be fixed on the circuit board 22 by ways of adhering, threading, engaging, soldering, or the like, but embodiments of the instant disclosure are not limited thereto. Alternatively, the light shielding barrel 30 may be fixed on other components inside the casing 10, and the movable end 32 of the light shielding barrel 30 are not fixed on the components inside the casing 10. In some embodiments, the light shielding barrel 30 may be a rectangular barrel, a circular barrel, a cubic barrel, or the like. Moreover, the light shielding barrel 30 may be, but not limited to, an opaque barrel, so that external stray lights do not enter into the barrel to interfere the photosensitive element 21 to perform the imaging.

Further, as shown in FIGS. 1 and 2, the movable lens barrel 40 is coaxially disposed with the light shielding barrel 30. For example, in this embodiment, the movable lens barrel 40 is movably fitted over the light shielding barrel 30; in other words, the movable lens barrel 40 and the light shielding barrel 30 are not fixed with each other, so that the movable lens barrel 40 is axially movable relative to the light shielding barrel 30. However, embodiments of the instant disclosure are not limited; the movable lens barrel 40 may be disposed with an inner periphery of the light shielding barrel 30 (namely, the light shielding barrel 30 is movably fitted over the movable lens barrel 40). The movable lens barrel 40 comprises a lens end 41 and a driving portion 45. In this embodiment, the lens end 41 is one end of the movable lens barrel 40 away from the photosensitive device 20. The lens end 41 comprises an optical lens 42, and the optical lens 42 is coaxially disposed with the photosensitive element 21 and the open end 12 of the casing 10. Hence, external lights can be transmitted to the photosensitive element 21 through the open end 12, the optical lens 42, and the light shielding barrel 30 to allow the photosensitive element 21 to perform the imaging. In some embodiments, the movable lens barrel 40 may be, but not limited to, an opaque barrel, so that external stray lights do not enter into the barrel to interfere the photosensitive element 21 to perform the imaging.

In some embodiments, movements of the movable lens barrel 40 and the light shielding barrel 30 may be limited with each other. Hence, the movable lens barrel 40 can be prevented from being detached off the light shielding barrel 30 easily or the movable lens barrel 40 can be prevented from being shaken during the movement of the movable lens barrel 40. As shown in FIG. 2, in this embodiment, the movable lens barrel 40 has a limit end 44 opposite to the lens end 41, a first limiting block 441 is protruding toward the light shielding barrel 30 from the limit end 41, and a second limiting block 321 is protruding toward the movable lens barrel 40 from the movable end 32 of the light shielding barrel 30. Accordingly, as shown in FIG. 3, when the movable lens barrel 40 is moved axially relative to the light shielding barrel 30 (in this embodiment, the movable lens barrel 40 is moved toward the open end 12 of the casing 10 relative to the light shielding barrel 30) and the limit end 44 is moved to the movable end 32 of the light shielding barrel 30, the first limiting block 441 and the second limiting block 321 limit with each other so as to prevent the movable lens barrel 40 from being detached off the light shielding barrel 30. Furthermore, the first limiting block 441 of the movable lens barrel 40 may further be in contact with the outer periphery of the light shielding barrel 30, and the second limiting block 321 of the light shielding barrel 30 may further be in contact with the inner periphery of the movable lens barrel 40, so that an axial limiting can be provided between the movable lens barrel 40 and the light shielding barrel 30. Hence, during the movement of the movable lens barrel 40, the movable lens barrel 40 can be prevented from being shaken, thereby improving the stableness of the movable lens barrel 40.

As shown in FIGS. 1 and 2, the driving device 50 is connected to the driving portion 45 of the movable lens barrel 40. The driving device 50 drives the movable lens barrel 40 to move axially relative to the light shielding barrel 30, so that the optical lens 42 selectively moves close or away from the photosensitive element 21. For example, in this embodiment, the driving device 50 comprises a screw 51, and the screw 51 is extending along the extension axis A; the driving portion 45 of the movable lens barrel 40 is an inner threaded hole 451 configured at the periphery of the movable lens barrel 40, and the screw 51 is threaded with the inner threaded hole 451. Accordingly, when the screw 51 is rotated relative to the inner threaded hole 451, the screw 51 drives the movable lens barrel 40 to move axially relative to the light shielding barrel 30. As shown in FIG. 2, when the lens end 41 of the movable lens barrel 40 is located adjacent to the movable end 32 of the light shielding barrel 30, the optical lens 42 of the movable lens barrel 40 is closest to the photosensitive element 21 of the photosensitive device 20. Under this configuration, when the screw 51 is rotated relative to the inner threaded hole 451 in one direction (for example in a clockwise direction), the screw 51 drives the movable lens barrel 40 to move axially toward the open end 12 of the casing 10 relative to the light shielding barrel 30, so that a distance between the optical lens 42 of the movable lens barrel 40 and the photosensitive element 21 is increased (as shown in FIG. 3). Conversely, when the screw 51 is rotated relative to the inner threaded hole 451 in a counter direction (for example in a counterclockwise direction), the screw 51 drives the movable lens barrel 40 to move axially toward the closed end 11 of the casing 10 relative to the light shielding barrel 30, so that the distance between the optical lens 42 of the movable lens barrel 40 and the photosensitive element 21 is decreased. Hence, the focal distance adjustment for performing optical imaging can be optimized freely. However, it is understood that the actuation relationship for the screw 51 and the movable lens barrel 40 are not limited to the foregoing embodiments. Please further refer to Table 1 below. When the movable lens barrel 40 is moved relative to the light shielding barrel 30, the distance between the optical lens 42 and the photosensitive element 21 (namely, the image distance in Table 1) and the distance between the optical lens 42 and an external object (namely, the object distance in Table 1) can be changed, so that the optical image sensed by the photosensitive element 21 can have different magnification or reduction ratio. Hence, a user can observe optical images with different magnification or reduction ratios without changing the lens, thereby improving the convenience in operation. Moreover, since the movable lens barrel 40 is driven by the screw 51, the moving distance of the movable lens barrel 40 can be finely controlled, so that a precise image capturing procedure can be performed.

TABLE 1

| Magnification ratio | Focal length | Image height | Object height | Total length | Image distance | Object distance | Optical imaging effect |
|---|---|---|---|---|---|---|---|
| −5.00 | 16 | −3.24 | 0.6480 | 115.2 | 96.0000 | −19.2000 | 5 times magnification |
| −4.70 | 16 | −3.24 | 0.6894 | 110.6043 | 91.2000 | −19.4043 | 4.7 times magnification |
| −4.60 | 16 | −3.24 | 0.7043 | 109.0783 | 89.6000 | −19.4783 | 4.6 times magnification |
| −4.00 | 16 | −3.24 | 0.8100 | 100.0000 | 80.0000 | −20.0000 | 4 times magnification |
| −3.50 | 16 | −3.24 | 0.9257 | 92.5714 | 72.0000 | −20.5714 | 3.5 times magnification |
| −3.00 | 16 | −3.24 | 1.0800 | 85.3333 | 64.0000 | −21.3333 | 3 times magnification |
| −2.50 | 16 | −3.24 | 1.2960 | 78.4000 | 56.0000 | −22.4000 | 2.5 times magnification |
| −2.00 | 16 | −3.24 | 1.6200 | 72.0000 | 48.0000 | −24.0000 | 2 times magnification |
| −1.50 | 16 | −3.24 | 2.1600 | 66.6667 | 40.0000 | −26.6667 | 1.5 times magnification |
| −1.00 | 16 | −3.24 | 3.2400 | 64.0000 | 32.0000 | −32.0000 | 1 time magnification |

Figure 5:
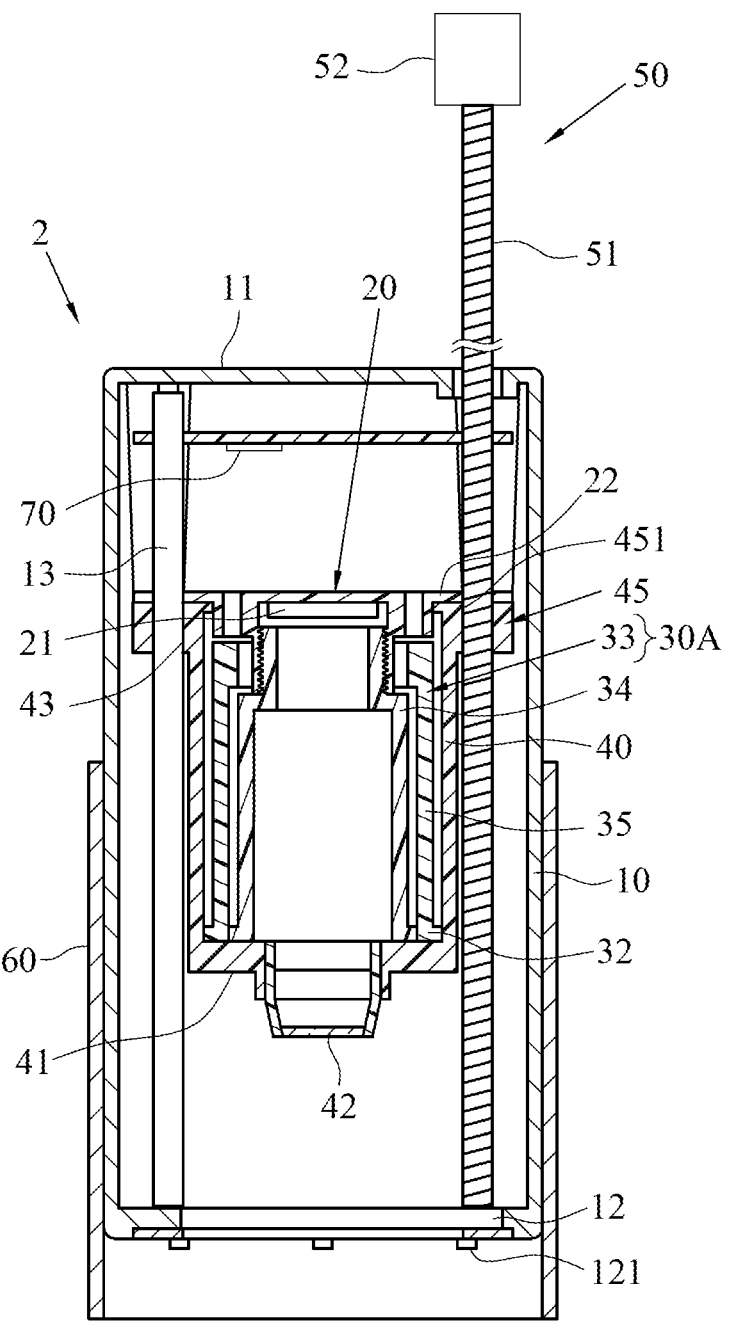
FIG. 5 illustrates a cross-sectional view of a digital imaging device according to a second embodiment of the instant disclosure.

In some embodiments, the screw 51 of the driving device 50 may be driven manually or electrically. As shown in FIGS. 2 and 3, the screw 51 of the driving device 50 is further extending out of the casing 10, so that the user can operate the screw 51 manually to rotate the screw 51 so as to change the magnification ratio of the optical image. Alternatively, as shown in FIG. 5, which illustrates a cross-sectional view of a digital imaging device according to a second embodiment of the instant disclosure. In this embodiment, the driving device 50 further comprises a driving motor 52, and the screw 51 may be connected to the driving motor 52, so that the screw 51 can be driven to rotate through the driving device 50. It is understood that the foregoing embodiments are provided for illustrative purposes but not limitations to the instant disclosure; in some embodiments, the driving device 50 may comprise other transmission structures other than the screw 51 (e.g., a belt or chain transmission structure or a gear transmission structure) connected to the driving portion 45 of the movable lens barrel 40, so that the movable lens barrel 40 can be driven to move axially relative to the light shielding barrel 30.

Further, as shown in FIGS. 2 and 3, in some embodiments, a first axial guiding member 13 is disposed inside the casing 10, the movable lens barrel 40 comprises a second axial guiding member 43, and the second axial guiding member 43 is axially and movably assembled with the first axial guiding member 13. Therefore, the axial movement of the movable lens barrel 40 relative to the light shielding barrel 30 can be more stable and the shaking during the movement can be avoided. In this embodiment, the first axial guiding member 13 is an axial guiding bar and fixed inside the casing 10, and the second axial guiding member 43 of the movable lens barrel 40 is a through hole configured at the periphery of the movable lens barrel 40 and located at one side of the movable lens barrel 40 opposite to the driving portion 45. The first axial guiding member 13 is axially inserted into the second axial guiding member 43. Hence, when the driving device 50 drives the movable lens barrel 40 to move axially relative to the light shielding barrel 30, the second axial guiding member 43 can move axially along the first axial guiding member 13, so that the two opposite sides of the movable lens barrel 40 can be respectively guided by the screw 51 and the first axial guiding member 43, thereby further improving the stableness of the axial movement of the movable lens barrel 40.

As shown in FIGS. 1 to 4, in this embodiment, the digital imaging device 1 is a digital microscope device and further comprises an object distance adjustment barrel 60. The object distance adjustment barrel 60 is disposed at the open end 12 of the casing 10, and in this embodiment, the object distance adjustment barrel 60 is fitted over the open end 12. For example, an end portion of the object distance adjustment barrel 60 extending out of the open end 12 can be placed on a plane, and a to-be-observed object can be placed in the object distance adjustment barrel 60. Hence, the distance between the optical lens 42 and the to-be-observed object can be changed according to the fixed position of the object distance adjustment barrel 60, thereby changing the magnification ratio of the optical image sensed by the photosensitive element 21 through the object distance adjustment barrel 60.

As above, in some embodiments, the object distance adjustment barrel 60 can be moved axially relative to the casing 10, so that the distance between the optical lens 42 and the to-be-observed object can be changed. As shown in FIG. 4, in this embodiment, the casing 10 comprises at least one first axial adjustment member 14, and the object distance adjustment barrel 60 comprises at least one second axial adjustment member 61. The second axial adjustment member 61 is axially and movably assembled with the first axial adjustment member 14, so that the object distance adjustment barrel 60 can be moved axially relative to the casing 10 by the first axial adjustment member 14 and the second axial adjustment member 61. For example, in the embodiment shown in FIG. 4, the casing 10 has two first axial adjustment members 14, and the two first axial adjustment members 14 are at two opposite sides of the casing 10. Each of the first axial adjustment members 14 is a plurality of tooth grooves 141 arranged along the extension axis A. The object distance adjustment barrel 60 has two second axial adjustment members 61, and the two second axial adjustment members 61 are at two opposite sides of the object distance adjustment barrel 60. Each of the second axial adjustment members 61 is an elastic piece and has an elastic clamp 611, and each of the elastic clamps 611 selectively clamps to one of the tooth grooves 141, so that the axial position of the object distance adjustment barrel 60 relative to the casing 10 can be changed. Hence, the distance between the optical lens 42 and the to-be-observed object can be changed, so that the digital imaging device 1 can adjust the magnification ratio of the optical image sensed by the photosensitive element 21 through the object distance adjustment barrel 60.

However, it is understood that the foregoing embodiments are provided as illustrative purposes, but not limitations to the instant disclosure. The first axial adjustment member 14 and the second axial adjustment member 61 may be other axial adjustment structures; for example, the first axial adjustment member 14 may be a plurality of holes, magnet members, or buckling members, arranged along the extension axis A, so that the second axial adjustment member 61 can be selectively fixed with one of the holes, the magnet members, or the buckling members.

Further, as shown in FIGS. 2 and 3, in one embodiment, the open end 12 of the casing 10 further comprises a light emitting element 121. The light emitting element 121 may be, for example, a light emitting diode (LED). Hence, when the digital imaging device 1 captures the optical image, a more clear optical image can be obtained by the illumination of the light emitting element 121. Moreover, at nighttime or insufficient illumination conditions, the light emitting element 121 can provide sufficient illumination for performing image capturing.

As shown in FIGS. 1 and 2, in one embodiment, the digital imaging device 1 further comprises a communication module 70. The communication module 70 is electrically connected to the photosensitive element 21. Hence, the optical image sensed by the photosensitive element 21 can be outputted to a user device through the communication module 70. For example, the optical image can be outputted to user's mobile device to be displayed on the display of the mobile device. Therefore, the user can watch the optical image instantly or can perform a live stream indoor or outdoor. In some embodiments, the communication module 70 may comprise a wired communication unit (as shown in FIG. 1) for performing a wired communication transmission. The wired communication transmission may be implemented by ways of the Ethernet, the universal serial bus (USB), the high definition multimedia interface (HDMI), mobile high-definition link (MHL), or the like. Alternatively, the communication module 70 may comprise a wireless communication unit (as shown in FIG. 2) for performing a wireless communication transmission. The wireless communication unit may be implemented by ways of the wireless networks, mobile communication technologies, or the like. In a further option, the communication module may comprise the wired communication unit and the wireless communication unit, so that the communication module is adapted to perform a wired communication transmission and a wireless communication transmission.

Figure 6:
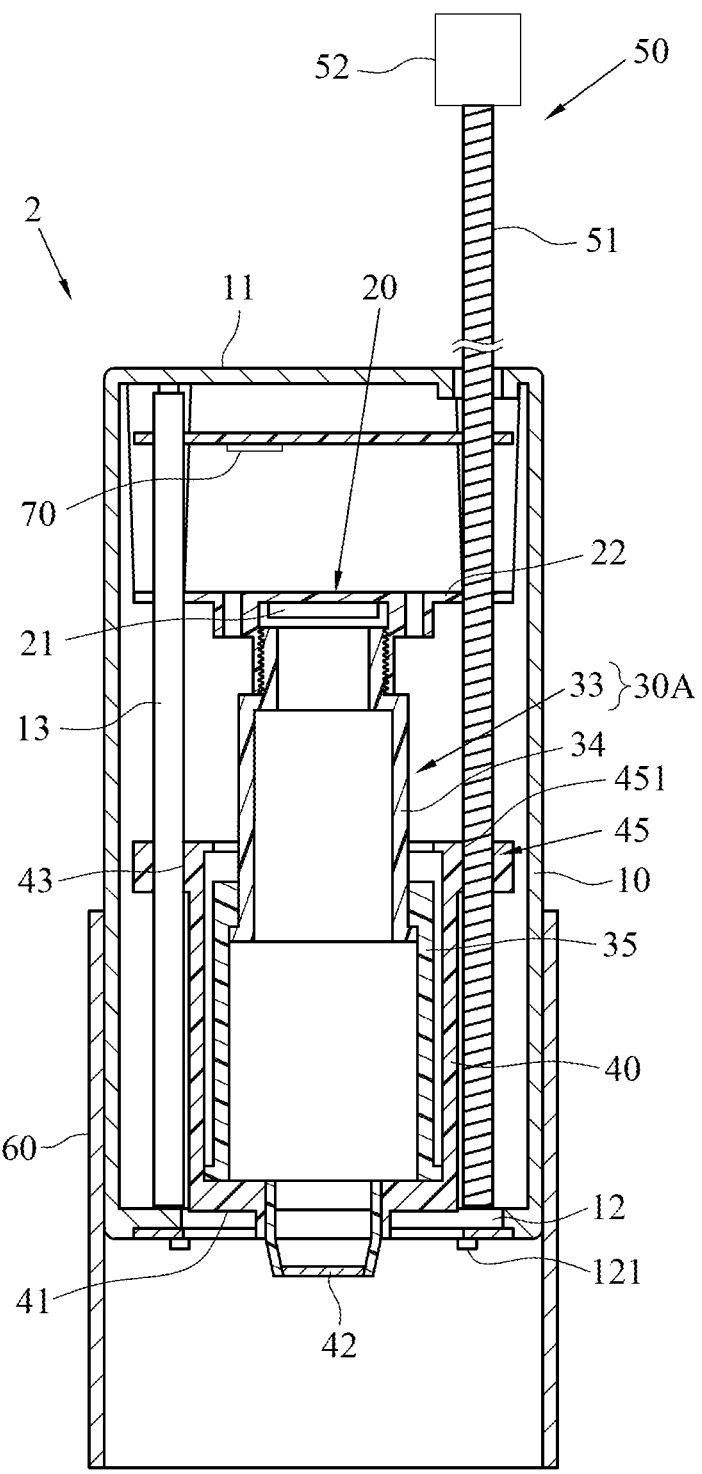
FIG. 6 illustrates a schematic operational view of the digital imaging device of the second embodiment.
Figure 7:
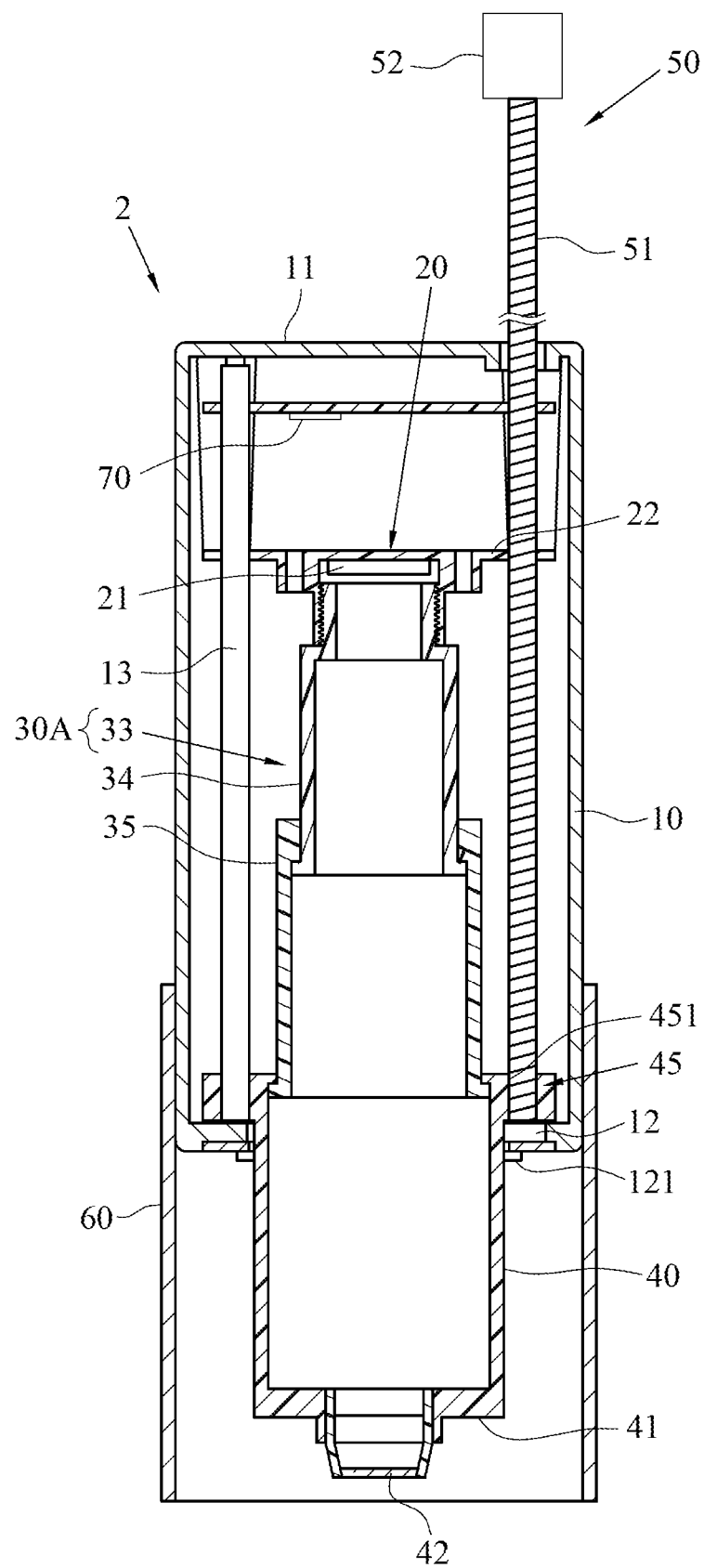
FIG. 7 illustrates another operational schematic view of the digital imaging device of the second embodiment.

In some embodiments, the light shielding barrel 30 may have a movable configuration, so that the range for distance adjustment between the optical lens 42 and the photosensitive element 21 can be extended, and optical images with different magnification ratios can be formed. As shown in FIGS. 5 to 7, a digital imaging device according to a second embodiment of the instant disclosure is illustrated. In this embodiment, as compared with the first embodiment, the light shielding barrel 30A of the digital imaging device 2 comprises a retractable sleeve assembly 33. The retractable sleeve assembly 33 comprises a first sleeve 34 and a second sleeve 35 coaxially fitted over the first sleeve 34. The first sleeve 34 is fixed inside the casing 10. For example, in this embodiment, the first sleeve 34 is fixed on the surface of the circuit board 22 of the photosensitive device 20 where the surface of the circuit board 22 faces the open end 12. The second sleeve 35 can be moved axially relative to the first sleeve 34. For example, in this embodiment, the second sleeve 35 is fitted over the first sleeve 34 and is axially movable relative to the first sleeve 34. The movable lens barrel 40 is fitted over the second sleeve 35, and the driving device 50 drives the movable lens barrel 40 to move axially relative to the second sleeve 35.

Accordingly, as shown in FIGS. 5 to 7, as compared with the first embodiment, in this embodiment, the range for distance adjustment of the movable lens barrel 40 can be further extended. As shown in FIG. 5, when the lens end 41 of the movable lens barrel 40 is located adjacent to the movable end 32 of the light shielding barrel 30A, the second sleeve 35 is between the first sleeve 34 and the movable lens barrel 40, and the optical lens 42 of the movable lens barrel 40 is closest to the photosensitive element 21 of the photosensitive device 20. Moreover, since the barrels and the sleeves are retractable, the length of the barrels or sleeves in this embodiment can be shorter than the length of the barrels or sleeves in embodiments where the barrels and the sleeves are not retractable. As compared with the embodiment shown in FIG. 2, the distance between the optical lens 42 and the photosensitive element 21 is much shorter. Hence, as shown in FIG. 6, under this configuration, when the screw 51 is rotated relative to the inner threaded hole 451 in one direction (for example in a clockwise direction), the screw 51 drives the movable lens barrel 40 to move axially toward the open end 12 of the casing 10 relative to the first sleeve 34, such that the distance between the optical lens 42 of the movable lens barrel 40 and the photosensitive element 21 is increased, and the second sleeve 35 is axially moved relative to the first sleeve 34 along with the movement of the movable lens barrel 40. Consequently, when the end portion of the first sleeve 34 and the end portion of the second sleeve 35 are abutted against and limited to each other (as shown in FIG. 6), the movable lens barrel 40 will move axially toward the open end 12 of the casing 10 relative to the second sleeve 35 (as shown in FIG. 7) if keeping rotating the screw 51, so that the distance between the optical lens 42 and the photosensitive element 21 can be increased. Similarly, when the screw 51 is rotated relative to the inner threaded hole 451 in a counter direction (for example in a counter-clockwise direction), the screw 51 drives the movable lens barrel 40 to move axially toward the closed end 11 of the casing 10 relative to the light shielding barrel 30A, so that the distance between the optical lens 42 of the movable lens barrel 40 and the photosensitive element 21 is decreased. Accordingly, in this embodiment, the movable lens barrel 40 can have a three-stage adjustment so as to provide an extended range for distance adjustment, thereby extending the range of magnification or reduction ratio of the optical image.

Figure 8:
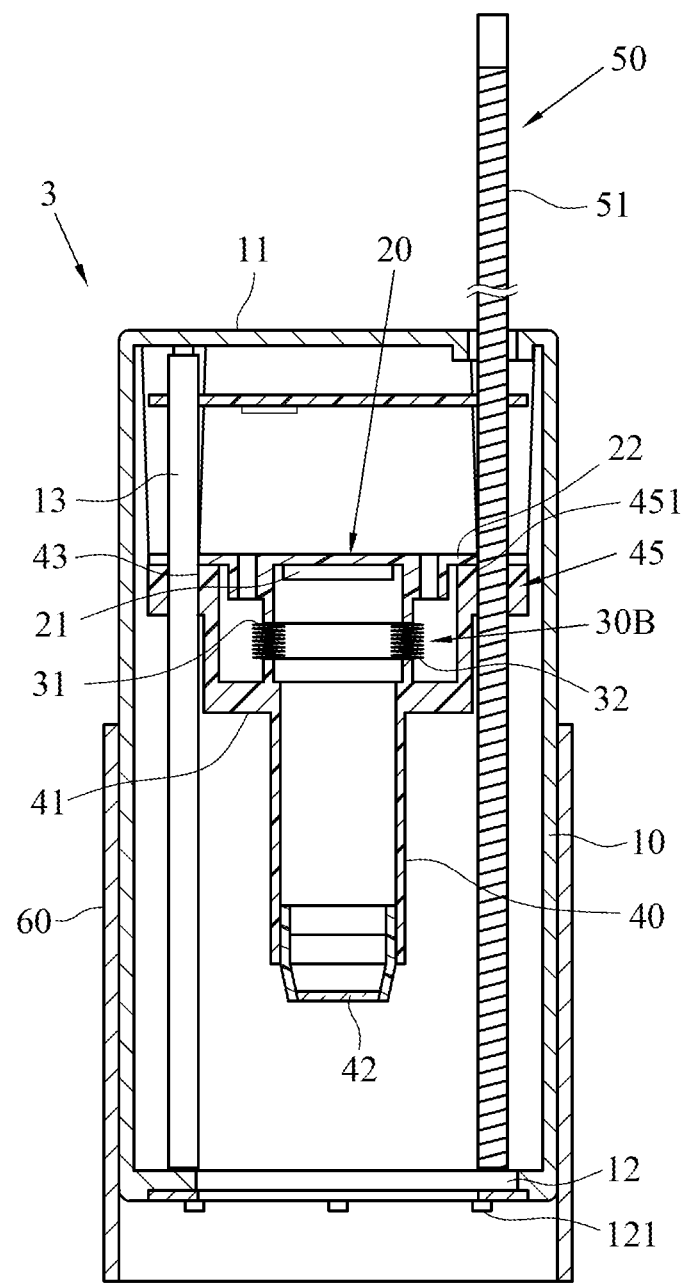
FIG. 8 illustrates a cross-sectional view of a digital imaging device according to a third embodiment of the instant disclosure.
Figure 9:
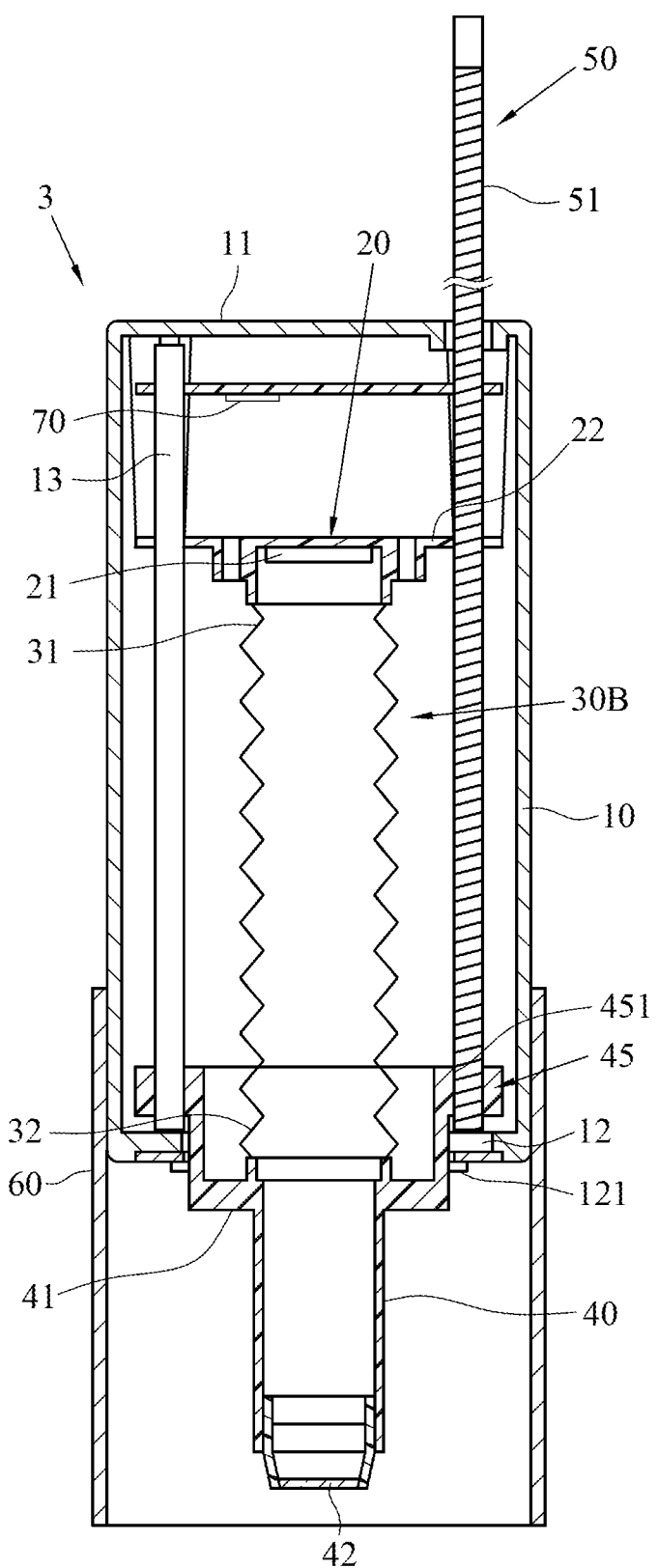
FIG. 9 illustrates a schematic operational view of the digital imaging device of the third embodiment.

As shown in FIGS. 8 and 9, a digital imaging device according to a third embodiment of the instant disclosure is illustrated. In this embodiment, as compared with the first embodiment, in this embodiment, the light shielding barrel 30B of the digital imaging device 3 is an elastic retractable sleeve. The light shielding barrel 30B is a barrel made of elastic materials, and the light shielding barrel 30B is elastically compressible toward the photosensitive element 21 or elastically extendable toward the open end 12 of the casing 10. The movable lens barrel 40 is fixed at the movable end 32 of the light shielding barrel 30B. Accordingly, when the screw 51 is rotated relative to the inner thread hole 451 in a clockwise direction or in a counterclockwise direction, the screw 51 drives the movable lens barrel 40 to move axially toward the photosensitive element 21 to compress the light shielding barrel 30B or to move axially toward the open end 12 of the casing 10 to extend the light shielding barrel 30B, thereby changing the distance between the optical lens 42 and the photosensitive element 21 to generate optical images with different magnification or reduction ratios. Furthermore, in this embodiment, the light shielding barrel 30B is configured as an elastic retractable barrel, so that the range for distance adjustment of the movable lens barrel 40 can be extended, thereby extending the range of magnification or reduction ratio of the optical image. For example, as shown in FIG. 8, the elastic light shielding barrel 30B can be compressed to be a flat structure such that the axial length of the light shielding barrel 30B can be reduced greatly. Hence, the distance between the optical lens 42 and the photosensitive element 21 of this embodiment is shorter than that of the embodiments shown in FIGS. 2 and 5. Therefore, an extended range for distance adjustment of the movable lens barrel 40 can be provided.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A digital imaging device, comprising:
   a casing extending along an extension axis, wherein the casing comprises a closed end and an open end opposite to the closed end;
   a photosensitive device disposed inside the casing and adjacent to the closed end, wherein the photosensitive device has a photosensitive element facing the open end;
   a light shielding barrel disposed inside the casing and extending along the extension axis, wherein the light shielding barrel comprises a fixed end and a movable end, the fixed end is fixed inside the casing and surrounding the photosensitive element;
   a movable lens barrel coaxially disposed with the light shielding barrel, wherein the movable lens barrel comprises a lens end and a driving portion, the lens end comprises an optical lens, the optical lens is coaxially disposed with the photosensitive element; and
   a driving device connected to the driving portion of the movable lens barrel, wherein the driving device drives the movable lens barrel to move axially relative to the light shielding barrel, so that the optical lens selectively moves near to or away from the photosensitive element;
   wherein the light shielding barrel comprises a retractable sleeve assembly, the retractable sleeve assembly comprises a first sleeve and a second sleeve coaxially fitted over the first sleeve, wherein the first sleeve is fixed inside the casing, the movable lens barrel is fitted over the second sleeve, and the driving device drives the movable lens barrel to move axially relative to the second sleeve.

2. The digital imaging device according to claim 1, wherein the driving device comprises a screw, the driving portion of the movable lens barrel is an inner threaded hole, and the screw is threaded with the inner thread hole.

3. The digital imaging device according to claim 2, wherein a first axial guiding member is disposed inside the casing, the movable lens barrel comprises a second axial guiding member, and the second axial guiding member is axially and movably assembled with the first axial guiding member.

4. The digital imaging device according to claim 1, wherein the driving device comprises a driving motor, and the driving motor drives the movable lens barrel to move axially relative to the light shielding barrel.

5. The digital imaging device according to claim 1, further comprising an object distance adjustment barrel, wherein the object distance adjustment barrel is disposed at the open end of the casing.

6. The digital imaging device according to claim 5, wherein the casing comprises a first axial adjustment member, the object distance adjustment barrel comprises a second axial adjustment member, and the second axial adjustment member is axially and movably assembled with the first axial adjustment member.

7. The digital imaging device according to claim 6, wherein the first axial adjustment member is a plurality of tooth grooves arranged along the extension axis, the second axial adjustment member comprises an elastic clamp, and the elastic clamp selectively clamps with one of the tooth grooves.

8. The digital imaging device according to claim 1, wherein the open end of the casing further comprises a light emitting element.

9. The digital imaging device according to claim 1, further comprising a communication module electrically connected to the photosensitive element.

10. The digital imaging device according to claim 9, wherein the communication module comprises at least one selected from a group consisting of a wired communication unit and a wireless communication unit.

* * * * *